US007168364B2

(12) United States Patent
Schneider

(10) Patent No.: US 7,168,364 B2
(45) Date of Patent: Jan. 30, 2007

(54) METHOD AND APPARATUS FOR MARKING WORKPIECES

(75) Inventor: Albrecht Schneider, Oberursel (DE)

(73) Assignee: Mate Precision Tooling Inc., Anoka, MN (US)

( * ) Notice: Subject to any disclaimer, the term of this patent is extended or adjusted under 35 U.S.C. 154(b) by 30 days.

(21) Appl. No.: 10/747,216

(22) Filed: Dec. 30, 2003

(65) Prior Publication Data

US 2004/0149149 A1 Aug. 5, 2004

Related U.S. Application Data

(63) Continuation of application No. 09/881,678, filed on Jun. 18, 2001, now abandoned, which is a continuation-in-part of application No. 09/688,094, filed on Oct. 16, 2000, now abandoned.

(30) Foreign Application Priority Data

Oct. 14, 1999 (DE) ................................ 199 49 552
Oct. 7, 2000 (DE) ................................ 100 49 701

(51) Int. Cl.
*C03B 33/027* (2006.01)

(52) U.S. Cl. ........................... 101/3.1; 101/26; 83/861; 83/865; 83/875; 83/879; 83/881; 29/34 R; 72/75; 72/418

(58) Field of Classification Search ................. 101/3.1, 101/4, 19, 24, 26, 30, 35; 400/127, 128, 400/134; 29/33 R, 34 R, 560; 72/75, 414, 72/418; 144/438, 361, 362; 83/861, 862, 83/865, 874, 875, 879, 880, 881, 886, 887
See application file for complete search history.

(56) References Cited

U.S. PATENT DOCUMENTS 3,847,078 A 11/1974 Krembel, Jr.

(Continued)

FOREIGN PATENT DOCUMENTS

DE 37 35 422 5/1989

(Continued)

*Primary Examiner*—Ren Yan
*Assistant Examiner*—Kevin D. Williams
(74) *Attorney, Agent, or Firm*—Stites & Harbison PLLC; Marvin Petry

(57) ABSTRACT

A method and an apparatus are provided for marking a sheet-shaped workpiece using a marking tool. The marking tool is mounted in a punch holder of a punch press and a counter-support is fixed in place on a side opposite of a marking surface of the workpiece to be marked. The surface of the workpiece is marked by displacing the workpiece in its plane while engaging the marking tool with the workpiece. In one form, a support roller provides counter-support. In another form, an elastic element is cooperatively associated with the punch stroke of the punch press to translate an exactly defined contact pressure force between the tool tip and the workpiece to be marked.

29 Claims, 2 Drawing Sheets

U.S. PATENT DOCUMENTS

| | | | | |
|---|---|---|---|---|
| 3,861,257 | A * | 1/1975 | Laird et al. | 83/22 |
| 4,019,548 | A * | 4/1977 | Lenderink et al. | 144/175 |
| 4,104,939 | A * | 8/1978 | Bonaddio | 83/883 |
| 4,120,220 | A * | 10/1978 | Mullen | 83/886 |
| 4,346,576 | A * | 8/1982 | Sivachenko | 72/49 |
| 4,385,540 | A * | 5/1983 | Dieter | 83/886 |
| 4,412,469 | A | 11/1983 | Hirata et al. | |
| 4,456,393 | A * | 6/1984 | Gomi et al. | 400/124.1 |
| 4,494,444 | A * | 1/1985 | Masse | 83/886 |
| 4,567,739 | A * | 2/1986 | Mascetti | 69/10 |
| 4,642,897 | A * | 2/1987 | Kirsch | 33/18.1 |
| 4,658,688 | A | 4/1987 | Shah et al. | |
| 4,672,874 | A * | 6/1987 | Gach | 83/881 |
| 4,767,581 | A * | 8/1988 | Tippmann | 264/46.4 |
| 4,835,872 | A * | 6/1989 | Alcantara et al. | 33/18.2 |
| 4,856,392 | A * | 8/1989 | Appelberg | 83/40 |
| 4,929,276 | A | 5/1990 | Chun et al. | |
| 5,038,654 | A * | 8/1991 | Mackey | 83/880 |
| 5,048,385 | A | 9/1991 | Eckert et al. | |
| 5,188,047 | A * | 2/1993 | Rohr et al. | 112/470.03 |
| 5,201,589 | A | 4/1993 | Chun et al. | |
| 5,259,100 | A | 11/1993 | Takahashi | |
| 5,344,243 | A * | 9/1994 | Sawa et al. | 400/124.32 |
| 5,382,102 | A * | 1/1995 | Brolund et al. | 400/134 |
| 5,393,707 | A * | 2/1995 | Canning | 438/33 |
| 5,474,319 | A * | 12/1995 | Shepherd | 280/302 |
| 5,474,391 | A * | 12/1995 | Andou et al. | 400/124.05 |
| 5,611,222 | A * | 3/1997 | Preece et al. | 69/9 |
| 5,649,795 | A | 7/1997 | Durham | |
| 5,682,657 | A * | 11/1997 | Hirose | 29/33 J |
| 5,752,424 | A | 5/1998 | Rosene et al. | |
| 5,775,215 | A * | 7/1998 | Hirate | 101/4 |
| 5,785,436 | A | 7/1998 | Harrison et al. | |
| 5,871,134 | A * | 2/1999 | Komagata et al. | 225/2 |
| 5,878,642 | A | 3/1999 | Roseliep | |
| 5,993,090 | A * | 11/1999 | Straka et al. | 400/134.4 |
| 6,047,621 | A | 4/2000 | Dries et al. | |
| 6,148,707 | A | 11/2000 | Kouno | |
| 6,164,203 | A * | 12/2000 | Keller | 101/407.1 |
| 6,179,549 | B1 * | 1/2001 | Hayakawa | 414/796.7 |
| 6,470,782 | B1 * | 10/2002 | Shimotoyodome et al. | 83/879 |
| 2003/0110657 | A1 * | 6/2003 | Scarborough | 33/668 |
| 2003/0127797 | A1 * | 7/2003 | Katz et al. | 273/251 |

FOREIGN PATENT DOCUMENTS

| | | |
|---|---|---|
| JP | 08281340 | 10/1996 |

* cited by examiner

METHOD AND APPARATUS FOR MARKING WORKPIECES

FIELD OF THE INVENTION

This application is a continuation of application Ser. No. 09/881,678 filed Jun. 18, 2001 now abandoned which is a continuation-in-part of prior application Ser. No. 09/688,094 filed Oct. 16, 2000 now abandoned.

The present invention relates to a method and an apparatus for marking workpieces on a punching press, wherein the marking tool is forced by means of the punching stroke either against the surface of the workpiece or a certain depth into the surface of the workpiece. The workpiece, which is generally a piece of flat sheet metal, is displaced within its plane in order to create a straight or curved marking line.

BACKGROUND OF THE INVENTION

There is an increasing demand for altering the surface of workpieces, including as one example, providing workpieces with individual identifications. In this connection the use of stamping dies is not always practical because the stamping is often also visible on the back of sheet metal workpiece. Difficulties in connection with stamping dies occur particularly when it is intended to punch parts of different lengths out of a sheet metal workpiece (e.g., in order to minimize waste) and wherein a certain orientation of the marking on the workpiece is desirable.

A known method for marking sheet metal consists of embossing dot matrices to produce an alpha-numeric symbol with the aid of a pointed embossing tool. The workpiece must be moved stepwise after each dot has been embossed. This results in a multitude of required stamping stroke cycles, just to represent a single symbol. Besides the large amount of required time and the increased wear of the driving mechanism for the stroke, which is driven in a quasi load-free manner, the loud noise is considered to be a disadvantage. A coarser dot matrix does simplify the marking process, but it also results in a more unsatisfactory matrix.

A qualitatively appealing marking can be achieved by inscribing markings into the surface of the workpiece, wherein no waviness or "rear embossing" will occur. Borries Markiersystem GmbH of Pliezhausen, for example, offers a machine, by means of which inscribing the desired identification is possible by displacing a tip forced into the surface of the workpiece in accordance with the contours of the marking.

It would seem that in principle one could employ such a known marking device in a punch press. However, if this were done, the space available for the main punching operation would be reduced and the progress of the main punching operation would be made more difficult. Also, this marking device could only operate within a limited portion of the area of the punch press so that movement of the sheet metal workpiece in order to apply markings on different areas thereof would become more difficult.

SUMMARY OF THE INVENTION

It is an object of the present invention to create an improved apparatus for altering the surface of a sheet metal workpiece, which apparatus can be integrated into a punching process in a punch press.

This object is attained in accordance with the invention by a method and an apparatus wherein a tool is equipped with a tip which, after having been forced against or into the surface of the workpiece, is maintained at a fixed position, at which time the workpiece is displaced in its plane in accordance with the desired result, and thereafter the tip is moved away from the workpiece to its rest position.

The principles of the present invention can be utilized to mark workpieces in many different ways. For example, a tool can be forced to a certain depth into the surface of the workpiece for an inscribing action. Or, a tool can be forced against the surface, without going beneath the surface, for the purpose of marking the surface. In another application, if the workpiece has a protective plastic cover over a metal base, such as a sheet metal base, a tool can be utilized to cut the plastic cover, while not altering the underlying metal sheet. These various applications of the present invention will be referred to as marking the workpiece, and the different apparatus and tools will be referred to as marking tools, or marking apparatus.

The production of markings of any arbitrary symbol or shape on or in the workpiece surface is made possible by means of the marking tool being placed on the punch press without any additional, space-consuming devices. At the same time a marking method is optimally integrated into the punching process so that, for example with a turret punch press, a sheet metal workpiece is first marked at the desired locations and thereafter is finished by means of the tools seated in other holders of the punch press. The marking tool may be arranged in a punch tool holder so that the marking can be made from above the workpiece. The orientation of the marking can be determined by means of the software which controls the workpiece driving mechanism.

It is also advantageous in connection with the operation of the invention that the tool tip need be moved only once into its marking position, so that the number of punch strokes which must be performed by the punch press is considerably reduced. The results are reduced noise generation and reduced wear of the stroke driving mechanism.

In one preferred embodiment of the invention, at least a portion of the punch stroke is absorbed by an elastic element which extends between a table for seating the workpiece and the punch tool holder.

Since punch presses are designed for very high processing forces, with high precision and almost load-free, it can be very difficult under certain circumstances to move the stroke driving mechanism into a precisely defined position. To compensate for this, it is possible by an elastic element to achieve considerably more precise movement of the tool tip on or into the surface of the workpiece. In the process, the elastic element translates the relatively large punch stroke of the punch press into an exactly defined contact pressure force of the tool tip, which leads to the desired marking position.

In a further preferred embodiment of the invention at least one marking is formed as a center mark, wherein, following pressing the tool tip, the workpiece is maintained in its predefined position until the marking tool is retracted.

It is desirable for some applications to be able to set a center mark on the workpiece, for example in order to be able to position or center bolts or pins which are to be welded onto the workpiece. The provision of the center mark can be integrated into the marking process and apparatus in accordance with the invention, wherein it might be advantageous if, in connection with a center mark, the tool tip were pressed deeper into the workpiece than the usual inscribing depth.

For example, when making a center mark it is possible in a further development of the invention that by different positioning of the tool tip with respect to a counter-support, for example, the spring travel of the tool tip reaches its maximum before it has reached the deepest depth in the workpiece. While making surface marks or inscribing are performed by means of a resilient tool tip, the latter rests against a stop when making a center mark.

It has been shown to be practical to guide the workpiece by means of at least one support roller which may be elastically spring-loaded in the area of the workpiece support table since, among other things, the support roller provides the required support for the workpiece while not hampering the displacement of the workpiece.

In one preferred embodiment, the present invention comprises at least one marking tool disposed in a punch press where the marking tool includes a tool tip, a guide bush axially supporting a support, and a marking tool elastic element operatively connecting a drive head to the tool tip. At least one counter-support is located opposite the marking tool and fixed in place on a side opposite of a marking surface of a workpiece to be marked. When the apparatus has a workpiece disposed between the marking tool and the counter-support, the marking tool is operable to be pressed onto or into a marking surface of the workpiece against a restoring force of the marking tool elastic element and mark the workpiece when the workpiece is translated in its plane.

In another form of the present invention, an apparatus for marking a sheet shaped workpiece comprises at least one marking tool fixed in place in a punch holder of a punch press and at least one counter-support fixed in place on the side of the workpiece located opposite the marking tool such that a workpiece can be disposed between the marking tool and a counter-support. The marking tool has a tool tip which can be pressed into or onto the workpiece against a restoring force of an elastic element. The elastic element is cooperatively associated with a punch stroke of the punch press to provide an exactly defined contact pressure force between the tool tip and a workpiece to be marked.

The counter-support preferably comprises at least one rotatable roller. The counter-support roller along with workpiece support table rollers facilitate movement of the workpiece during marking. Moreover the counter-support roller provides mobility without damage to the workpiece surface, and minimizes frictional losses such that they occur only at the contact point between the workpiece and counter-support roller.

For an inscribing marking tool, a tool with a cone shaped tip is used. The tip is preferably forced into the workpiece surface, so that an inscribing force is achieved regardless of the direction of movement. Shapes which are not round are also conceivable. Moreover, the inscribing element may cut grooves of different thicknesses into the workpiece surface.

In accordance with yet another preferred embodiment, the marking tool has an adjustable support, by means of which the position of the tool tip and/or the prestress of its elastic element can be adjusted.

The adjustable support makes possible the individual adaptation of the contact depth, for example in order to improve the clarity of the shapes formed in the workpiece, or to make possible an adaptation to the material of the workpiece.

As mentioned above, with the present invention, it is possible to make a marking such as an ink marking or the like on the surface of the sheet metal instead of inscribing the marking into the sheet metal. Making an ink marking would use the same method and apparatus as described above with respect to inscribing except that the method and the equipment would be adjusted such that the marking tools such as a pen or the like would simply be forced with sufficient pressure against the surface of the workpiece, as opposed to entering into the surface of the workpiece. Any suitable pen could be used including for example, a ball-point pen, a roller ball pen, a felt tip pen or a grease pencil.

Alternatively, a marking tool made of brass, plastic or any other material which is incapable of cutting the workpiece may be utilized for the purpose of marking a shape in a protective covering placed over the workpiece without damaging the workpiece.

Thus, it is an object of the present invention to provide a new and improved method and apparatus for marking a workpiece, wherein the apparatus is incorporated within a punch press.

It is another object of the present invention to provide a new and improved method and apparatus for marking a sheet-shaped workpiece in conjunction with a punch press, wherein the marking can be either inscribed into the surface of the workpiece, made as an ink marking on the surface of the workpiece or made as a cut in a protective covering placed over the workpiece.

It is a further object of the present invention to provide a new and improved method and apparatus for marking a sheet-shaped workpiece in conjunction with a punch press where an elastic element is associated with the punch stroke of the punch press to translate an exactly defined contact pressure force between a marking tool tip and a workpiece to be marked.

These and other objects of the present invention will become more apparent from the detailed description to follow.

BRIEF DESCRIPTION OF THE DRAWINGS

The invention will now be described in detail with respect to preferred embodiments of the invention wherein.

DETAILED DESCRIPTION OF THE PREFERRED EMBODIMENTS

Figure 1:
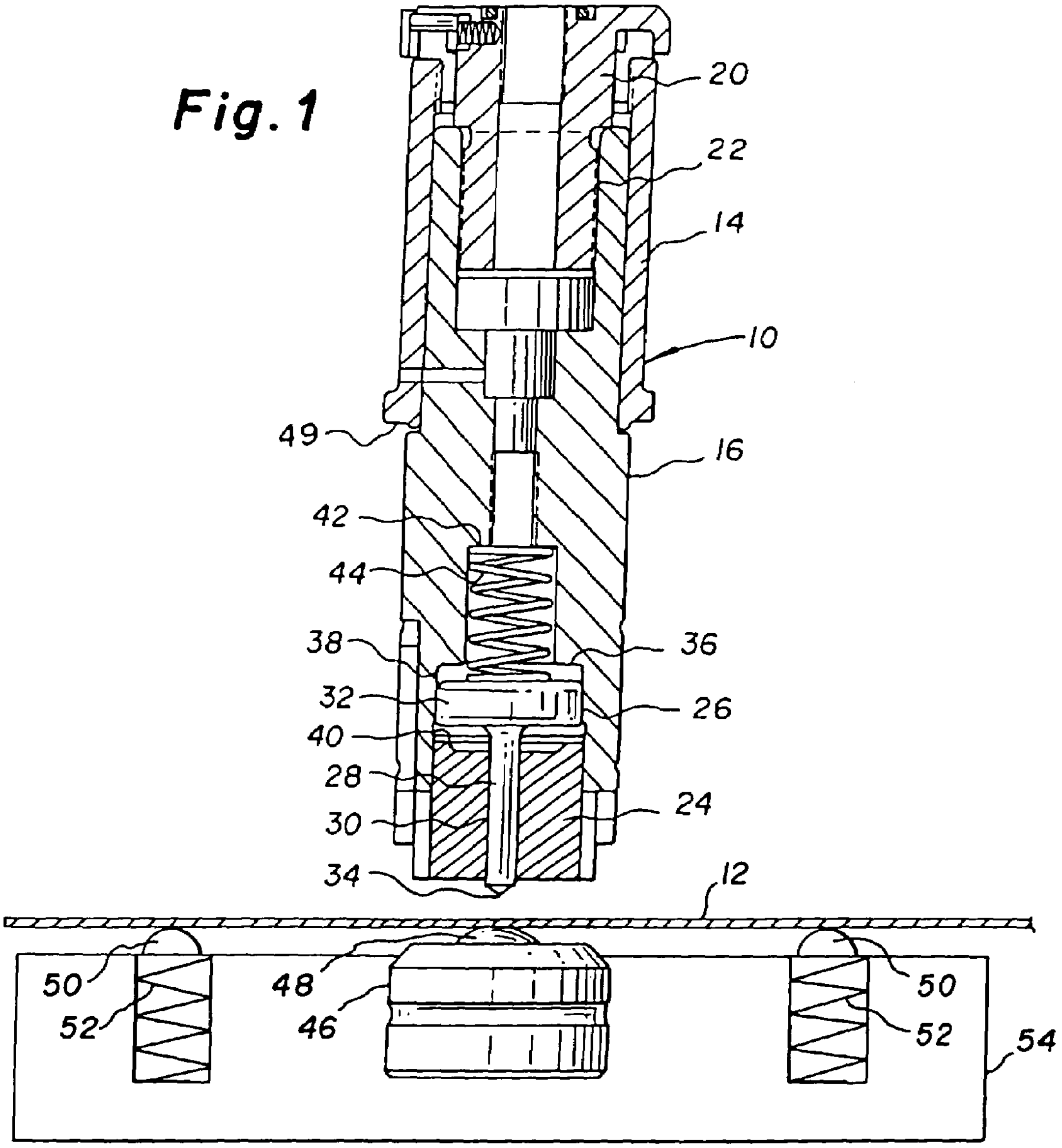
FIG. 1 is a central cross sectional view of a marking tool for insertion into a punch holder of a punching press.

Referring now to the drawings, like elements are represented by like numerals throughout the several views.

Referring to FIG. 1, the marking tool has a guide bush 14, in which a support 16 is axially guided, and a driving head 20, which are in engagement with each other via a threaded connection 22. By means of a guide insert 24, the support 16 holds a marking tool 26, which is axially movable with respect to the support 16 and has a tool shaft 28 which is guided in an appropriately fitted bore 30 of the guide insert 24, a pressure plate 32, formed at the top of the shaft 28, as well as an inscribing element 34, seated on the free lower end of the shaft 28. The tip 34 of the marking tool can be of different constructions, depending on the type of mark to be made. In a first embodiment, the tip 34 may be made of a hard material and shaped as a pointed cone to be used as an inscribing element. As an inscribing element, 34 can be made, for example, of a diamond, boron nitride, a hard metal, or an otherwise suitable material for inscribing the respective workpiece.

The axial mobility of the marking tool 26 in relation to the support 16 is limited by a first shoulder 36 of a bore 38 in the support 16, and by the top 40 of the guide insert 24 inserted into the bore 38. A compression spring 44, arranged under prestress between a second shoulder 42 and the pressure plate 32, urges the pressure plate 32 downwardly against the top 40 of the guide insert 24.

In the exemplary embodiment represented, the workpiece 12 is a sheet metal plate which rests on a counter-support 46 with a rotatably seated ball 48, wherein the contact point between the workpiece 12 and the ball 48 lies exactly in alignment with the inscribing element 34.

In a preferred form, the workpiece 12 is guided by means of support rollers, such as support rollers 50 mounted in workpiece support table 54. Rollers 50 are elastically spring-loaded by compression springs 52.

To inscribe a symbol on the workpiece 12, the workpiece is first appropriately aligned with the marking tool 10. Thereafter, lowering of the marking tool 26 is started by actuating the stroke driving mechanism of the punch press, which acts on the driving head 20, wherein the guide bush 14 is urged against the support 16 by means of a shoulder 49. In the course of the downward movement of the support 16 the marking tool 26 is initially moved along until the element 34 rests on the surface to be cut. The continued downward movement of the support 16 leads to compression of the compression spring 44, and therefore the pressure exerted on the pressure plate 32 steadily increases. Where the element 34 is a diamond tip, it will actually penetrate the surface of the workpiece as a result of the pressure exerted by the compression spring. Maximum penetration depth is reached at the end of the punch stroke. The compression spring 44 provides for precise movement of the tool tip 34 on or into the surface of workpiece 12. During marking, the compression spring 44 translates a relatively large punch stroke of the punch press into an exactly defined contact pressure force of the tool tip 34 which leads to a desired marking position.

In some applications, it is desirable to use an element 34 which is not capable of penetrating the surface of the workpiece 12. Here, instead of utilizing a diamond tip, the element 34 is constructed from a material which does not penetrate the workpiece. It is often desirable to protect the workpiece 12 from inadvertent scratches or other blemishes which can occur during processing. For example, if the workpiece is stainless steel and will ultimately be used in the manufacture of an appliance or the like, the workpiece 12 may be covered with a plastic film or other protective covering during the hole punching or cutting operations. In order to create holes in the workpiece 12 in such cases, it is desirable to remove areas of the protective covering where the workpiece 12 will eventually be cut by a punch or a laser. This is necessary because the protective covering may interfere with the accuracy of such cuts in the workpiece 12. In order to cut holes in the protective covering without damaging the workpiece 12, a marking element 34 constructed from plastic or brass, or another material which is too soft to penetrate the workpiece may be utilized. Thus, when pressure is exerted by the compression spring 44, the element 34 will penetrate the surface of the protective covering (not shown), but will not penetrate the surface of the workpiece 12.

An adjustment of the penetration depth of the element 34 (when used as an inscribing element) can be performed by a relative turning of the driving head 20 in relation to the support 16. This changes the effective total combined length of support 16 and driving head 20. With this increased length of the support 16 and driving head 20 the element 34 reaches the surface to be cut earlier in the punch stroke and the pressure built up by means of the compression spring 44 becomes correspondingly greater.

As an inscribing marking tool, as soon as the element 34 reaches its inscribing position, the stroke driving mechanism of the punch press is blocked. Conversely, if the stroke driving mechanism of the punch press did not permit the marking tool to stop in the inscribing position, a separate detent device must be provided between the support 16 and the guide bush 14. With the element 34 held down, the workpiece 12 is now displaced in its plane in order to form the contours of the symbol or shape to be inscribed, wherein any arbitrary orientation of the symbol or shape is possible by an appropriate control of the workpiece driving mechanism. When the symbol or shape has been completely inscribed, the stroke driving mechanism is reversed, wherein first the support 16 is moved away from the workpiece 12 because of the diminishing pressure force by the compression spring 44 and, following the contact of the pressure plate 32 with the top 40 of the guide insert 24, the element 34 is lifted off the workpiece 12. The workpiece 12 is appropriately horizontally displaced within its plane and the inscribing process is repeated for inscribing additional symbols or shapes.

During the horizontal displacement of the workpiece 12, the roller ball 48 of the counter-support 46 follows this movement, wherein an optimal counter-support directly in alignment with the inscribing element 34 always exists. Because the roller ball 48 turns, sliding movements against the underside of the workpiece 12 are prevented, so that the underside of the workpiece 12 is not detrimentally affected.

Where the marking tool of FIG. 1 is used in a punch press the guide bush 14 is adapted to the tool holder and the driving head 20 is adapted to the stroke driving mechanism of the punch press.

The compression spring 44 can be replaced with a pneumatically or hydraulically operating pressure spring.

Figure 2:
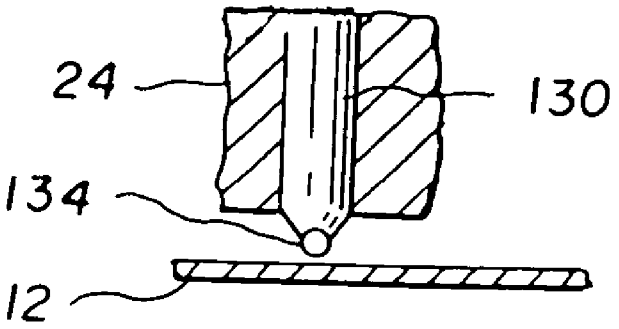
FIG. 2 is an enlarged view of a portion of FIG. 1, but showing a modification thereof.

FIG. 2 illustrates a modification of the present invention wherein, instead of an inscribing element, there is provided an ink point 134 for marking the surface of the workpiece 12 without penetrating same. Ink point 134 is shown at the lower end of a shaft 134 mounted in guide insert 24 of FIG. 1. All of the above described features of all embodiments of the invention can utilize an ink point 134 to mark the surface of a workpiece in place of the previously described elements for inscribing the workpiece and/or forming a center mark. As would be understood by one of ordinary skill in the art, when using an ink marking point 134, one would simply adjust movements of all of the other movable parts such that instead of penetrating the workpiece, the apparatus would move the ink point 134 to a position where it exerted sufficient force onto the workpiece to form an ink marking. As with the other embodiments, the workpiece 12 could then be displaced horizontally within its plane so as to form an ink shape or symbol of straight or curved lines. Any type of known ink point could be used such as a ball-point, a roller ball point, a felt tip or a grease pencil.

Although the invention has been described in considerable detail with respect to preferred embodiments thereof, it will be apparent that the invention is capable of numerous modifications and variations, apparent to those skilled in the art without departing from the spirit and scope of the invention.

What is claimed is:

1. An apparatus for marking a sheet-shaped workpiece, said apparatus comprising:

a punch press, said punch press having a stroke driving mechanism;

at least one marking tool disposed in the punch press, said marking tool comprising a tool tip, a guide bush axially supporting a support, a marking tool elastic element, and a drive head, said marking tool elastic element operatively connecting the drive head to the tool tip, said stroke driving mechanism acting upon said drive head to force the marking tool towards the workpiece; and at least one counter-support located opposite the marking tool and fixed in place on a side opposite of a marking surface of the workpiece, wherein, when said apparatus has a workpiece disposed between the marking tool and the counter-support, the marking tool is operatable to be pressed onto or into a marking surface of the workpiece against a restoring force of the elastic element, and the marking tool marks the workpiece while the workpiece is translated in its plane.

2. The apparatus according to claim 1, wherein the counter-support includes at least one rotatable support roller or support ball for the movable support of the workpiece.

3. The apparatus according to claim 1 further comprising a workpiece support table having rotatable support rollers seated in an elastically spring-loaded manner.

4. The apparatus according to claim 1, wherein the tool tip is selected from the group consisting of diamond, boron nitride or a hard alloy.

5. The apparatus according to claim 1 wherein the tool tip is cone-shaped.

6. The apparatus according to claim 1, wherein said support is adjustable to vary the position of the tool tip and/or the prestress of said elastic element.

7. The apparatus according to claim 1, wherein the marking tool comprises an ink point for writing a marking on the surface of the workpiece.

8. The apparatus according to claim 1, wherein the counter-support is aligned with the marking tool.

9. An apparatus for marking a sheet-shaped workpiece, said apparatus comprising:

a punch press, said punch press having a stroke driving mechanism;

at least one marking tool fixed in place in a punch holder in the punch press, the marking tool having a drive head, a marking tool elastic element, and a tool tip, said marking tool elastic element operatively connecting the drive head to the tool tip, said stroke driving mechanism acting upon said drive head to force the marking tool towards the workpiece, the elastic element cooperatively associated with the stroke driving mechanism to provide an exactly defined contact pressure force between the tool tip and the workpiece; and at least one counter-support fixed in place on the side of the workpiece located opposite the marking tool, with a workpiece being disposable between the marking tool and the counter-support, wherein, when said apparatus has a workpiece disposed between the marking tool and the counter-support, the tool tip is operatable to be pressed onto or into a marking surface of the workpiece against a restoring force of the elastic element, and the marking tool marks the workpiece while the workpiece is translated in its plane.

10. The apparatus of claim 9, wherein the elastic element provides for a desired marking position of the workpiece.

11. The apparatus of claim 9, wherein the elastic element provides for precise movement of the tool tip onto the surface of the workpiece.

12. The apparatus of claim 9, wherein the elastic element comprises a hydraulically operating pressure spring.

13. The apparatus of claim 9, wherein the marking tool comprises a guide bush axially supporting a support and a driving head which is operatively connected to the marking tool elastic element.

14. The apparatus of claim 9, wherein the marking tool marks the workpiece when the workpiece is translated in its plane.

15. The apparatus according to claim 9, including at least one rotatable support roller for the movable support of the workpiece.

16. The apparatus according to claim 9 further comprising a workpiece support table including rotatable support rollers seated in an elastically spring-loaded manner.

17. A method for marking workpieces on punch presses, wherein a marking tool having a tool tip is forced by means of a punch stroke onto or into the surface of a sheet-shaped workpiece, which is displaceable in its plane, comprising:

providing a punch press having a stroke driving mechanism for performing a punch stroke;

placing the tool in a marking position by performing a punch stroke, thereby forcing the tool tip onto or into the surface of a workpiece;

maintaining the tool in the marking position;

displacing the workpiece corresponding to contours of a shape to be marked while the tool is in the marking position; and moving the tool away from the workpiece.

18. The method according to claim 17, further comprising mounting the marking tool in a punch holder of the punch press.

19. The method according to claim 17, wherein at least a portion of the punch stroke is absorbed by an elastic element extending between a workpiece supporting table and the punch tool holder.

20. The method according to claim 19, wherein the elastic element cooperates with the punch stroke to provide an exactly defined contact pressure between the tool tip and the workpiece.

21. The method according to claim 19, further comprising forming a center mark after the tool tip has entered the workpiece, and maintaining the tool in a predetermined position until the marking tool is retracted.

22. The method according to claim 21, further comprising forcing the tool tip deeper into the workpiece when forming a center mark than during the marking process.

23. The method according to claim 22, wherein, during said step of forcing, spring travel of the tool tip reaches its limit before deepest penetration of the tool tip has been reached.

24. The method according to claim 17, further comprising guiding the workpiece by at least one support roller or support ball in the area of the workpiece supporting table and/or the punch holder.

25. The method of claim 17, wherein the step of forcing the tool tip comprises forcing the tool tip into the surface of the workpiece, such that displacing the workpiece causes inscribing the shape to be marked.

26. The method of claim 17, wherein the step of forcing the tool tip comprises forcing the tool tip against the surface of the workpiece, such that displacing the workpiece causes marking the desired shape on the surface of the workpiece.

27. The method of claim 17, wherein the workpiece has a plastic protective film, and the step of forcing tool tip comprises forcing a tool tip against the surface of the workpiece a sufficient amount to cut the plastic film but not penetrate the surface of the workpiece.

28. The apparatus of claim 2, wherein the at least one rotatable support roller or support ball provides translation of the workpiece in both an X and Y direction of the plane of the workpiece.

29. The apparatus of claim 2, wherein the counter-support includes a support ball.

* * * * *